(12) United States Patent
Chandler et al.

(10) Patent No.: US 6,773,812 B2
(45) Date of Patent: Aug. 10, 2004

(54) MAGNETICALLY-RESPONSIVE MICROSPHERES

(75) Inventors: Don J. Chandler, Austin, TX (US); Michael A. Herren, Austin, TX (US)

(73) Assignee: Luminex Corporation, Austin, TX (US)

( * ) Notice: Subject to any disclaimer, the term of this patent is extended or adjusted under 35 U.S.C. 154(b) by 0 days.

(21) Appl. No.: 09/826,960

(22) Filed: Apr. 6, 2001

(65) Prior Publication Data

US 2001/0046602 A1 Nov. 29, 2001

Related U.S. Application Data

(60) Provisional application No. 60/194,889, filed on Apr. 6, 2000.

(51) Int. Cl.[7] .................................................. B32B 5/16
(52) U.S. Cl. ........................ 428/403; 428/407; 428/900
(58) Field of Search .................................. 428/403, 407, 428/900

(56) References Cited

U.S. PATENT DOCUMENTS

| | | | |
|---|---|---|---|
| 4,126,458 A | * | 11/1978 | Creatura et al. |
| 4,230,685 A | | 10/1980 | Senyei et al. |
| 4,267,247 A | * | 5/1981 | Ziolo et al. |
| 4,339,337 A | | 7/1982 | Tricot et al. |
| 4,506,030 A | | 3/1985 | Jones |
| 4,554,088 A | * | 11/1985 | Whitehead et al. ...... 252/62.54 |
| 4,774,265 A | | 9/1988 | Ugelstad et al. |
| 5,200,270 A | * | 4/1993 | Ishida et al. |
| 5,356,713 A | | 10/1994 | Charmot et al. |
| 5,395,688 A | * | 3/1995 | Wang et al. |
| 5,648,124 A | * | 7/1997 | Sutor .......................... 427/475 |
| 5,948,627 A | | 9/1999 | Lee et al. |
| 5,981,180 A | | 11/1999 | Chandler et al. |
| 6,133,047 A | * | 10/2000 | Elaissari et al. |
| 6,527,972 B1 | * | 3/2003 | Fuchs et al. ............. 252/62.54 |

FOREIGN PATENT DOCUMENTS

| | | |
|---|---|---|
| EP | 463 144 | 12/1990 |
| EP | 0 919 285 A2 | 6/1999 |
| WO | WO 91/09141 | 6/1991 |
| WO | WO 96/37313 | 11/1996 |

* cited by examiner

*Primary Examiner*—H Thi Le
(74) *Attorney, Agent, or Firm*—Charles D. Huston; Ann Marie Mewherter; Conley Rose P.C.

(57) ABSTRACT

Microspheres are constructed using magnetic particles. Hybrid microspheres are constructed using fluorescent or luminescent microspheres and magnetic nanoparticles. Reactive moieties on the surface of the resultant particles can be used for attachment of biologically active molecules, thus allowing selective separations and analytical assays to be performed. Distinguishable subsets of microspheres can be constructed based on fluorescent intensities, and separations can be affected based on variable degree of magnetic content.

28 Claims, No Drawings

MAGNETICALLY-RESPONSIVE MICROSPHERES

1. REFERENCES

This application claims the benefit of priority from Provisional Application Serial No. 60/194,889 filed Apr. 6, 2000.

2. FIELD OF THE INVENTION

This invention relates to magnetically-responsive particles, magnetically-responsive fluorescently-tagged particles, and the fabrication of such particles. The methods described can be used to fabricate particle populations that are distinguishable from each other by fluorescence and/or magnetic response. Multiple particle populations thus constructed will find utility in a number of fields, including clinical biological assays.

3. BACKGROUND OF THE INVENTION

Microspheres have long been used as substrates on which to perform chemical reactions.

Catalysts for chemical modifications, such as hydrogenation or hydroformylation, can be attached to polymer beads to facilitate separation of the catalyst from the reaction products (U.S. Pat. No. 4,506,030, incorporated herein by reference). It is also a well known technique to couple biological molecules to the surface of a microsphere to assay the presence or absence of a reacting species in a biological sample; an example of such an assay would be an antigen-antibody reaction (U.S. Pat. No. 5,948,627, incorporated herein by reference).

This assay system can be improved by conducting the reaction on a microsphere (or other carrier particle) that has been labeled with a fluorescent material. The use of fluorescent labels on or in the microspheres allows preparation of numerous distinguishable sets of microspheres, based on different dye emission spectra or signal intensity. In the case of their use in a biological assay, these particles can then be analyzed on a flow cytometer to classify the size and fluorescence of the particles, as well as the fluorescence associated with the assay system being studied (e.g., a fluorescently labeled antibody in a "capture sandwich" assay)(U.S. Pat. No. 5,948,627, incorporated herein by reference). This concept has been developed even further by incorporating multiple dyes in a particle, and creating distinguishable sets by using varying concentrations of these dyes. In this manner, hundreds, or even thousands, of different microsphere sets can be produced. In an assay, each different microsphere set would be associated with a different target, thus allowing numerous tests to be conducted on a single sample in a single container (U.S. Pat. No. 5,981,180, incorporated herein by reference).

Another method of modifying the particle is to incorporate a magnetically responsive substance, such as $Fe_3O_4$, into the structure. Such particles may be manufactured in a number of ways. For example, by adding the magnetic substance to the reaction vessel prior to initializing the polymerization that forms the particle (U.S. Pat. No. 4,339,337, incorporated herein by reference). In this case the magnetically responsive material is dispersed throughout the polymeric particle. A variation of this concept involves encapsulation of one or more magnetic particles in a hydrophobic polymeric shell (U.S. Pat. No. 5,356,713, incorporated herein by reference). Another method utilizes pH-induced precipitation of metal salts onto and into the pores of a polymeric microsphere (U.S. Pat. No. 4,774,265, incorporated herein by reference). The resulting particle may then be further coated with polymer to fix the magnetic material into the final particle. No attempt has been made to make particles with different magnetic response so that different populations would be discernable.

Magnetic particles such as these have found a number of uses in biomedical research and diagnostics. Antibodies targeted to specific cells can be coupled to magnetic microspheres, then, upon exposure to a biological sample, these cells can be selectively removed and collected by applying a magnetic field, towards which the target cell-microsphere pair will migrate (U.S. Pat. No. 4,230,685, incorporated herein by reference). Similarly, immunoassays may be performed on the surface of magnetic beads, and the magnetic field is applied to immobilize the microparticle during a wash step.

Magnetically-responsive fluorescent particles have also been made (EP 0463144B1). Magnetic particles may be directly dyed by either covalently coupling a dye to the surface of the particle, or by absorbing a hydrophobic dye into the particle. The former option has the disadvantage of the dye being exposed to the surrounding environment, and it is known that varying this solvent environment often results in spectral changes for the dye. When the fluorescent intensity must be tightly controlled, these spectral changes can not be tolerated. Absorption of the dye into the particle allows the dye to be exposed to a consistent environment, thus providing consistent spectral properties, but the dyeing process involves the use of organic solvents, which are often incompatible with the polymer used to form the particle. A polymer such as polystyrene can be used if it also contains a cross-linker, such as divinylbenzene. However, the layered construction of many magnetic particles results in a microsphere, that, upon immersion in organic solvents which leads to a swelling of the polymer, often loses its sphericity or some of its magnetic component. Depending on the desired use, this may or may not be acceptable.

Another approach is to add the magnetic material to a dyed particle. This can be accomplished through the salt precipitation technique described earlier, and, if the dye in the particle is not sensitive to the reaction conditions, results in an adequate particle. It may, however, be necessary to add another layer of polymeric material to the particle in order to immobilize the magnetic component. This is usually accomplished with a free radical initiated polymerization, which often causes dye decomposition.

4. SUMMARY OF THE INVENTION

This invention relates to particles, and methods of making particles, with a desired magnetic response. The term "particle" refers to a core particle, for example a microsphere or bead, associated with at least one magnetic material. The core particle may also, for example, be associated with reactants, fluorescent tags, and other materials known in the art to be useful with core particles. The term "magnetic," as used hereinafter, includes all types of materials that respond to magnetic fields, such as, but not limited to, ferromagnetic, paramagnetic, and superparamagnetic materials. The term "magnetic material" encompasses any material having at least some magnetic content and therefore includes material having an amount of magnetic material ranging from greater than 0% to 100%. In some embodiments, the magnetic material is a polymeric magnetic material. Polymeric magnetic material includes for example, material in which the magnetic material is mixed with polymeric material and magnetic material which is coated with polymeric material. The term "reactant" encompasses any substance capable of associating with at least one other substance, and which is used to identify or quantitate an analyte in solution. For example, antibodies and antigens can both be reactants. Surface reactive moieties such as amines, thiols, carboxylic acids, hydrazines, halides, alcohols, and aldehydes are also non-limiting examples of reactants. The term "analyte" refers to any substance suspected of being present in a sample.

In one aspect, the present invention provides particles having a desired magnetic response. The phrase "magnetic response" refers to attractive or repulsive forces as a result of the application of a magnetic field. The magnetic response can be, for example, migration rate or retention time in response to a magnetic field. "Desired" implies that the amount and type of magnetic material associated with the core particle are chosen by the skilled artisan to provide a core particle having a magnetic response suitable to achieve the skilled artisan's preferred end result. The migration rate need not be quantitative (e.g. distance/time), but may be qualitative (e.g., faster or slower than another population of particles). So too, retention time may be quantitative or qualitative. The phrase "population of particles" refers to a set of particles that are similar, for example in magnetic response and other classification parameters (such as fluorescent intensity) where relevant, to the extent they can be identified as belonging to that population.

In one aspect, the present invention provides methods for controlling the amount of magnetic material associated with particles thereby controlling the magnetic response of the particles.

In one aspect, the present invention provides methods for forming populations of particles, each population having a different desired magnetic response. The magnetic response relates to the type and amount of magnetic material. In some embodiments, each population uses a different magnetic material, but the amount of magnetic material used per particle is about the same for each population. In some embodiments, each population uses the same magnetic material but varies the amount. For example, the magnetic material can be in the form of a nanosphere and each population uses the same size nanospheres, but a different number of nanospheres per particle, or else each population can use a different size nanosphere but the same number of nanospheres per particle, or else a combination of varying the size and number of nanospheres as long as each population has a different desired magnetic response.

In one aspect, the invention provides fluorescently-tagged particles having a desired magnetic response. In some embodiments, those "hybrid" particles have very defined fluorescent and magnetic responses. The phrase "very defined" implies that there is little variation in the fluorescent and magnetic signal from bead to bead in a population. "Little variation" means that the particles of one population can be distinguished from the particles of another population. In some embodiments "little variation" means that the fluorescent intensities of the particles are within 10% of one another and the magnetic response of particles of one population can be distinguished from the magnetic response of particles of another population.

In one aspect, the present invention provides populations of particles and pooled populations of those particles, wherein one population is distinguishable from another population based at least on the magnetic response of the particles within a population.

In one aspect, the present invention provides methods for making particles with a desired magnetic response. In some embodiments, the desired magnetic response is achieved by associating magnetic material of chosen average size with core particles. In some embodiments, the desired magnetic response is achieved by associating a chosen amount of magnetic material with core particles. The chosen amount, or magnetic content, can be controlled by varying the magnetic content of the magnetic material associated with the core particles, and/or by varying the total amount of magnetic material associated with the core particles.

In one aspect, the present invention provides a method of making particles having a desired magnetic response by associating magnetic nanoparticles with the core particles. The term "nanoparticle" and "nanosphere" are used interchangeably.

It will be apparent to one of ordinary skill in the art, from the description in this specification, that specific embodiments of the present invention may be directed to one, some or all of the above-indicated aspects as well as other aspects, and may encompass one, some or all of the above- and below-indicated embodiments as well as other embodiments. Thus, for example, a method according to the present invention may comprise making particles have a desired magnetic response by choosing both the size of the magnetic nanoparticles, the content of the nanoparticles, and the content of magnetic material associated with each core particle.

5. DESCRIPTION OF SPECIFIC EMBODIEMNTS

In some embodiments, this invention utilizes a variation of the technique of adding a magnetically responsive substance to a fluorescent particle, to create a hybrid particle with very defined fluorescent and magnetic responses. This can be accomplished, in one example, by covalently linking commercially available magnetic nanospheres to the surface of an internally dyed polymeric microsphere. This coupling can be achieved by choosing nanospheres and microspheres with mutually reactive groups, such as amino functionalized nanospheres and carboxylate functionalized microspheres, using techniques familiar to those skilled in the art. It should be noted that, while the fluorescence of the hybrid microsphere imparts additional distinguishing parameters to the particle, the techniques of this invention do not require a fluorescent particle.

Core particles are commercially available in a wide range of compositions, sizes, and surface functionalities. Almost any composition is acceptable, but if it is desired to absorb dye into the particle there are some limitations that are known to those skilled in the art. Some of the common materials used are polymers of styrene, divinyl benzene, silica, or acrylamide. The size of the particle is usually determined by the eventual use, and common sizes range from 1 micrometer to 100 micrometers in diameter, but other sizes will work as well. It should be noted, however, that greater uniformity in size leads to more uniformity in dye uptake and magnetic component binding. Surface functionalities can be selected from a number of different reactive moieties, such as amines, thiols, carboxylic acids, hydrazine, halides, alcohols, or aldehydes. This is not meant to comprise a complete list of particle compositions, sizes, or functionalities.

Similarly, nanoparticles used in this invention are also commercially available in a wide range of compositions, sizes, surface finctionalities, and the concentration and composition of the magnetic component. Nanospheres can be purchased, for example, from Bangs Laboratories, Inc. (9025 Technology Drive, Fishers, Ind. 46038), Micromed Partikeltechnolgie, GmbH (Rostock Germany), and Chemicell (Germany). Commonly available particle compositions are polystyrene, silica, and chitosan. Typically, commercially available particles have diameters of 100 nanometers to 1 micrometer, although larger and smaller magnetic particles will function, also. Surface functionalities may be chosen from a wide variety of reactive molecules, including those listed for the microparticles, and one skilled in the art would be familiar with the large number of methods of creating the bond between the nanoparticles and the microparticle. The concentration of the magnetic component can be from nearly 0% up to 100%, so long as there is a way to attach this nanoparticle to the microparticle. The composition of the magnetic component can be any substance that responds to a magnetic field, such as magnetite, hematite, chromium dioxide, or ferrite alloys. Again, these are only some examples of nanoparticle compositions that are acceptable for use in this invention, and are not intended to represent a comprehensive list.

An aspect of this invention is the control of the magnetic content of the resultant particle. This can be accomplished in several ways; for example, by varying the magnetic content of the nanoparticles coupled to the microsphere, or by varying the number of nanoparticles coupled to each microparticle. The magnetic content of the nanoparticles can be varied, for example, by using nanoparticles of different size and/or by using nanoparticles which are composed of a different amount of magnetic material. That is, the nanoparticle might be 50% magnetic material and 50% other (i.e., non-magnetic) materials such as polymer, or else it might by 90% magnetic material and 10% other materials.

The first method, i.e., varying the magnetic content of the nanosphere, would require a number of different nanoparticles equal to the number of different hybrid magnetic microparticles desired. This is acceptable if the number of distinctive particles needed is relatively few. However, if a large numbers of distinguishable hybrid particles are needed, the preferred method would be to control the number of nanoparticles in each hybrid particle. This is easily accomplished by controlling the reaction stoichiometry.

5.1 General Procedures for the Preparation of Magnetic Microspheres

5.1.1 Materials

Microspheres used in the following examples were 5.6 microns in diameter, composed of polystyrene with 5% divinyl benzene and 5% methacrylic acid. The dyes and the dyeing techniques used to create the fluorescent microspheres are proprietary, but other fluorescent microspheres are available from commercial sources. PBS is phosphate buffered saline, EDC is 1-(3-Dimethylaminopropyl)-3-ethylcarbodiimide hydrochloride, and S-NHS is N-hydroxysulfosuccinimide, all of which are commonly available.

5.2 EXAMPLES

5.2.1 Example 1

In a 1.5 ml microcentrifuge tube was placed 500 µL of dyed microspheres solution (10% solid in water). The tube was centrifuged @ 3600×g for 1 minute and the liquid was decanted. The microspheres were resuspended in 500 µL of $NaH_2PO_4$ buffer solution via sonication and agitation. To the mixture were added 50 µL of S-NHS (50 mg/ml in $NaH_2PO_4$). The solution was mixed by agitation. To the mixture was added 50 µL of EDC (50 mg/ml in $NaH_2PO_4$) and it was again mixed by agitation. The tube was then rotated for 30 minutes. The tube was then removed and centrifuged @ 3600×g for 1 minute and the liquid was decanted. The microspheres were then washed in 1.0 ml of PBS buffer (7.4 pH). The solution was again centrifuged and the liquid decanted. The microspheres were then resuspended in 500 µL of PBS. To the solution was added 1.0 ml of magnetic silica nanospheres (100 nm, 10 mg/ml). The tube was then wrapped in foil and placed on the rotator for 2 hours. The tube was then removed and diluted to 50 µL with PBS. The microspheres and excess nanoparticles were separated via vacuum filtration using a 3.0 micron Millipore filter. The filtered microspheres were washed with water. The filter was removed and allowed to dry away from the light. The dried microspheres were then transferred from the filter to a clean microcentrifuge tube. The newly coupled magnetic microspheres were then resuspended in 1.0 ml of water.

5.2.2 Example 2

In a 1.5 ml microcentrifuge tube was placed 500 µL of dyed microspheres solution (10% solid). The tube was centrifuged @ 3600×g for 1 minute and the liquid was decanted. The microspheres were resuspended in 500 µL of $NaH_2PO_4$ buffer solution via sonication and agitation. To the mixture were added 50 µL of S-NHS (50 mg/ml in $NaH_2PO_4$). The solution was mixed by agitation. To the mixture were added 50 µL of EDC (50 mg/ml in $NaH_2PO_4$) and mixed by agitation. The tube was then wrapped in aluminum foil and placed on a rotator for 30 minutes. The tube was then removed and centrifuged @ 3600×g for 1 minute and the liquid was decanted. The microspheres were then washed in 1.0 ml of PBS (7.4 pH). The solution was again centrifuged and the liquid decanted. The microspheres were then resuspended in 500 µL of PBS. To the solution was added 1.0 ml of magnetic silica nanospheres (250 nm, 10 mg/ml). The tube was then wrapped in foil and placed on the rotator for 2 hours. The tube was then removed and diluted to 50 µL with PBS. The microspheres and excess nanoparticles were separated via vacuum filtration using a 3.0 micron Millipore filter. The filtered microspheres were washed with water. The filter was removed and allowed to dry away from the light. The dried microspheres were then transferred from the filter to a clean microcentrifuge tube. The newly coupled magnetic microspheres were then resuspended in 1.0 ml of water.

5.2.3 Example 3

In a 1.5 ml microcentrifuge tube was placed 500 µL of dyed microspheres solution (10% solid). The tube was centrifuged @ 3600×g for 1 minute and the liquid was decanted. The microspheres were resuspended in 500 µL of $NaH_2PO_4$ buffer solution via sonication and agitation. To the mixture were added 50 µL of S-NHS (50 mg/ml in $NaH_2PO_4$). The solution was mixed by agitation. To the mixture were added 50 µL of EDC (50 mg/ml in $NaH_2PO_4$) and mixed by agitation. The tube was then wrapped in aluminum foil and placed on a rotator for 30 minutes. The tube was then removed and centrifuged @ 3600×g for 1 minute and the liquid was decanted. The microspheres were then washed in 1.0 ml of PBS (7.4 pH). The solution was again centrifuged and the liquid decanted. The microspheres were then resuspended in 500 µL of PBS. To the solution was added 1.0 ml of magnetic chitosan nanospheres (500 nm, 25 mg/ml). The tube was then wrapped in foil and placed on the rotator for 2 hours. The tube was then removed and diluted to 50 µL with PBS. The microspheres and excess nanoparticles were separated via vacuum filtration using a 3.0 micron Millipore filter. The filtered microspheres were washed with water. The filter was removed and allowed to dry away from the light. The dried microspheres were then transferred from the filter to a clean microcentrifuge tube. The newly coupled magnetic microspheres were then resuspended in 1.0 ml of water.

5.2.4 Example 4

Into two 1.5 ml microcentrifuge tubes was placed 500 µL of dyed microspheres solution (10% solid). The tubes were centrifuged @ 3600×g for 1 minute and the liquid was decanted. The microspheres were resuspended in 500 µL of $NaH_2PO_4$ buffer solution via sonication and agitation. To the mixtures were added 50 µL of S-NHS (50 mg/mL in $NaH_2PO_4$). The solutions were mixed by agitation. To the mixtures were added 50 µL of EDC (50 mg/ml in $NaH_2PO_4$) and mixed by agitation. The tubes were then wrapped in aluminum foil and placed on a rotator for 30 minutes. The tubes were then removed and centrifuged @ 3600×g for 1 minute and the liquid was decanted. The microspheres were then washed in 1.0 ml of PBS (7.4 pH). The solutions were again centrifuged and the liquid decanted. The microspheres were then resuspended in 500 µL of PBS. To one solution was added 1.0 ml of magnetic nanospheres (250 nm, 10 mg/ml), while 0.1 ml of magnetic nanospheres was added to the second tube. The tubes were then wrapped in foil and placed on the rotator for 2 hours. The tubes were then removed and diluted to 50 µL with PBS. The microspheres and excess nanoparticles were separated via vacuum filtration using a 3.0 micron Millipore filter. The filtered microspheres were washed with water. The filters were removed and allowed to dry away from the light. The dried microspheres were then transferred from the filters to two clean microcentrifuge tubes. The newly coupled magnetic microspheres were then resuspended in 1.0 ml of water.

5.2.5 Comparison of Migration Rates

The microcentrifuge tubes containing the magnetic microspheres from Example 1, 2 and 3 were placed into a magnetic particle concentrator (Dynal MPC-E-1). The migration of the microspheres to the side of the tube was observed and timed. The times were then compared to one another in order to determine whether the different size of magnetite resulted in varying migration rates.

The resulting hybrid microparticles did show a difference in migration times. The microspheres coupled with the 100 nm magnetic particles had the slowest migration time of 4:10 minutes. The microspheres coupled with the 250 nm particles migrated at a faster rate of 3:30 minutes. Finally, the microspheres that were coupled with the 500 nm chitosan particles migrated the fastest with a time of 2:45 minutes. This data shows that the migration time of the coupled microspheres can be manipulated by the size of the magnetic particle coupled to the surface.

A second experiment comparing migration times was conducted using the two bead sets created in Example 4. The two sets of microspheres had both been coupled with the 250 nm magnetic particles, but one set had a high concentration of magnetic particles while the other set had a low concentration of particles. The migration rates were then compared to each other. The migration rate of the microspheres coupled with a high concentration of magnetic particles was observed to be 3:13 minutes, while the migration rate of the microspheres with a low concentration of magnetic particles was observed to be 5:27 minutes. This data reveals the migration rates of the coupled microspheres can be manipulated by the concentration of the magnetic particles coupled to the surface.

A person of ordinary skill will appreciate from this specification that changes can be made to the embodiments described above without departing from the broad inventive concept thereof. It is understood, therefore, that this invention is not limited to the particular embodiments disclosed but is intended to cover modifications within the spirit and scope of the invention. For example, the core particle can also include some magnetic content and that amount can be taken into account when making particles having a desired magnetic response. As another example, particles having a desired magnetic response can be formed by associating microspheres with magnetic material having no polymeric content, i.e., is 100% magnetic. The desired magnetic response can be obtained by controlling the size of such magnetic material and the amount of such material that associates with the microspheres. Also, if a uniform coating of nanospheres on a microsphere is desired, but it is not desired to completely coat the microsphere with magnetic nanospheres, then non-magnetic nanospheres may be mixed with magnetic nanospheres and the mixture can then be coupled to the microsphere. By mixing magnetic and non-magnetic nanospheres in different ratios, fully coated microspheres of different magnetic response can be synthesized.

What is claimed is:

1. A particle, comprising:
    a core particle; and
    at least one substance, bonded covalently with said core particle, comprising magnetic material and polymeric material, wherein an amount and type of magnetic material in said substance ranges from greater than 0% to nearly 100% of said substance, and wherein said amount and type of magnetic material is chosen to achieve a desired magnetic response from said particle upon exposure to a magnetic field.

2. A particle according to claim 1, wherein the core particle is a microsphere or bead.

3. A particle according to claim 2, wherein the microsphere or bead ranges in size from about 1 µm to about 100 µm.

4. A particle according to claim 1, wherein the at least one substance is a nanosphere comprising polymeric material and magnetic material.

5. A particle according to claim 4, wherein the size of the nanosphere and the amount of the nanosphere is chosen to achieve the desired magnetic response.

6. A particle, comprising:
    a core particle; and
    an amount of at least one magnetic substance, bonded covalently with said core particle, wherein said amount of said at least one magnetic substance is effective to achieve a desired magnetic response from said particle upon exposure to a magnetic field.

7. A particle according to claim 6, further comprising at least one reactant.

8. A particle according to claim 7, wherein the at least one reactant has a surface-reactive moiety chosen from amines, thiols, carboxylic acids, hydrazines, halides, alcohols, and aldehydes.

9. A particle according to claim 6, wherein the at least one magnetic substance is chosen from ferromagnetic, paramagnetic and superparamagnetic materials.

10. A particle according to claim 6, wherein the at least one magnetic substance includes a magnetic component chosen from magnetite, hematite, chromium dioxide, and ferrite alloys.

11. A particle according to claim 6, wherein the magnetic substance has a magnetic content ranging from greater than 0% to 100%.

12. A particle according to claim 6, wherein the magnetic substance further comprises polymeric material.

13. A particle according to claim 12, the magnetic substance comprising a core of 100% magnetic material and a coating comprising polymeric material.

14. A particle according to claim 6, wherein the at least one magnetic substance is chosen from magnetic nanospheres.

15. A particle according to claim 14, further comprising non-magnetic nanospheres.

16. A particle according to claim 15, wherein the core particle is uniformly coated with the at least one magnetic substance.

17. A particle according to claim 6, wherein the core particle is uniformly coated with the at least one magnetic substance.

18. A particle according to claim 17, wherein the core particle is completely coated with the at least one magnetic substance.

19. A particle according to claim 6, further comprising at least one fluorescent tag.

20. A set of particles, comprising:
pooled populations of particles comprising at least a first population of particles and another population of particles, wherein particles of each population comprise at least one magnetic substance covalently bonded with a core particle in an amount effective for achieving a desired magnetic response upon exposure to a magnetic field, and wherein said first population of particles is distinguishable from said another population of particles based at least on said desired magnetic response of the particles within said first population upon exposure to a magnetic field.

21. A method of forming magnetically-responsive particles, comprising:
bonding covalently with a core particle at least one magnetic substance in an amount effective for achieving a desired magnetic response upon exposure to a magnetic field.

22. A method according to claim 21, wherein the at least one magnetic substance is covalently bonded to said core particle.

23. A method according to claim 21, wherein the at least one magnetic substance is chosen from magnetic nanospheres.

24. A method according to claim 23, wherein the size and number of the magnetic nanospheres determines the amount effective for achieving a desired magnetic response.

25. A method of forming a magnetically-responsive population of particles, comprising:
selecting an amount of magnetic substance for achieving a desired magnetic response upon exposure to a magnetic field;
selecting a population of particles wherein particles of said population comprise core particles; and
covalently bonding the amount of magnetic substance with said core particles.

26. A method according to claim 25, wherein the magnetic substance is chosen from magnetic nanospheres, and the amount of magnetic substance is selected by choosing the size of the nanospheres, the type of magnetic content of the nanospheres, the concentration of magnetic content of the magnetic nanospheres, and the number of nanospheres.

27. A method of forming a pooled set of magnetically-responsive populations of particles, said particles comprising a core particle and at least one magnetic substance bonded covalently with said core particle, comprising:
combining a population of particles having a desired magnetic response with at least one other population of particles having a different desired magnetic response.

28. A method according to claim 27, wherein the magnetic response relates to the amount of at least one magnetic substance covalently bonded with core particles in a population.

* * * * *